(12) United States Patent
Ovando Sánchez et al.

(10) Patent No.: US 11,660,937 B2
(45) Date of Patent: May 30, 2023

(54) VEHICLE REGISTER ASSEMBLY

(71) Applicant: Ford Global Technologies, LLC, Dearborn, MI (US)

(72) Inventors: José Fernando Ovando Sánchez, Toluca (MX); Jason William Nisbett, Southgate, MI (US); Michael Murphy McElroy, South Lyon, MI (US); Zachary Orion Baker, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 359 days.

(21) Appl. No.: 16/594,619

(22) Filed: Oct. 7, 2019

(65) Prior Publication Data

US 2021/0101452 A1  Apr. 8, 2021

(51) Int. Cl.
*B60H 1/34* (2006.01)

(52) U.S. Cl.
CPC .................. *B60H 1/3428* (2013.01)

(58) Field of Classification Search
CPC ................ B60H 1/3428; B60H 1/3421; B60H 2001/3471; F24F 13/15
USPC ........................................................ 454/155
See application file for complete search history.

(56) References Cited

U.S. PATENT DOCUMENTS

| | | | | |
|---|---|---|---|---|
| 4,665,804 A | * | 5/1987 | Miyasaka | ............ B60H 1/3428 454/315 |
| 4,699,322 A | * | 10/1987 | Jobst | ...................... B60H 1/345 239/513 |
| 4,735,131 A | * | 4/1988 | Matsuno | ................. F24F 13/15 454/143 |
| 5,364,303 A | | 11/1994 | Terry | |
| 5,397,267 A | | 3/1995 | Vecellio et al. | |
| 6,685,555 B1 | * | 2/2004 | Davis, Jr. | ............ B60H 1/3421 454/155 |
| 8,733,484 B1 | | 5/2014 | Klop | |
| 9,073,408 B2 | | 7/2015 | Hoke et al. | |
| 2011/0247779 A1 | | 10/2011 | Charnesky et al. | |

(Continued)

FOREIGN PATENT DOCUMENTS

| | | | | |
|---|---|---|---|---|
| JP | 2007118884 A | * | 5/2007 | |
| JP | 2016078733 A | * | 5/2016 | ............... B60H 1/34 |

OTHER PUBLICATIONS

Yamamoto, JP 2007-118884 A English machine translation, May 17, 2007 (Year: 2007).*

(Continued)

*Primary Examiner* — Avinash A Savani
*Assistant Examiner* — Ryan L Faulkner
(74) *Attorney, Agent, or Firm* — Vichit Chea; Price Heneveld LLP (57) ABSTRACT

A vehicle register assembly includes a register duct that has an end opening and the register duct directs air. A housing is coupled to the register duct proximate the end opening. A barrel is disposed within the housing and defines an upstream aperture and a downstream aperture. A plurality of vanes includes individual vanes and the individual vanes extend in a first direction between first opposing sides of the barrel. A linking vane is coupled to each of the individual vanes and extends between second opposing sides of the barrel. The linking vane includes a guide body that extends upstream from the plurality of vanes.

20 Claims, 8 Drawing Sheets

(56) References Cited

U.S. PATENT DOCUMENTS

2014/0273807 A1    9/2014   Frayer, III
2019/0047377 A1*   2/2019   Tanaka ................. B60H 1/3428

OTHER PUBLICATIONS

Kato, Haruo, JP2016078733 Translation.pdf, "Register", May 2016, pp. 1-14.*

* cited by examiner

VEHICLE REGISTER ASSEMBLY

FIELD OF THE DISCLOSURE

The present disclosure generally relates to a register assembly. More specifically, the present disclosure relates to a register assembly for a vehicle.

BACKGROUND OF THE DISCLOSURE

Vehicles often include ductwork that extends through various portions of a vehicle including within a dashboard. The ductwork may connect an HVAC system with a register for providing air to an interior of the vehicle.

SUMMARY OF THE DISCLOSURE

According to at least one aspect of the present disclosure, a vehicle register assembly includes a register duct that has an end opening and the register duct directs air. A housing is coupled to the register duct proximate the end opening. A barrel is disposed within the housing and defines an upstream aperture and a downstream aperture. A plurality of vanes includes individual vanes and the individual vanes extend in a first direction between first opposing sides of the barrel. A linking vane is coupled to each of the individual vanes and extends between second opposing sides of the barrel. The linking vane includes a guide body that extends upstream from the plurality of vanes.

According to another aspect of the present disclosure, a register assembly for a vehicle includes a register duct that has an end opening. A barrel is coupled to the register duct proximate the end opening and the barrel defines an upstream aperture and a downstream aperture. A plurality of vanes includes individual vanes where the individual vanes extend in a first direction between first opposing sides of the barrel. A linking vane includes a guide body and extends in a second direction. The linking vane includes a linking edge coupled to the individual vanes and the guide body extends outwardly therefrom. The linking vane extends between second opposing sides of the barrel.

According to yet another aspect of the present disclosure, a register assembly includes a register duct that has an end opening. A barrel is coupled to the register duct proximate the end opening. A plurality of vanes are spaced-apart from one another and extends between first opposing sides. Each of the plurality of vanes defines a coupling member. A linking vane extends between second opposing sides and has a linking edge coupled to the plurality of vanes. The linking edge defines a plurality of apertures for receiving corresponding coupling members and a guide body that extends outwardly from the linking edge.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
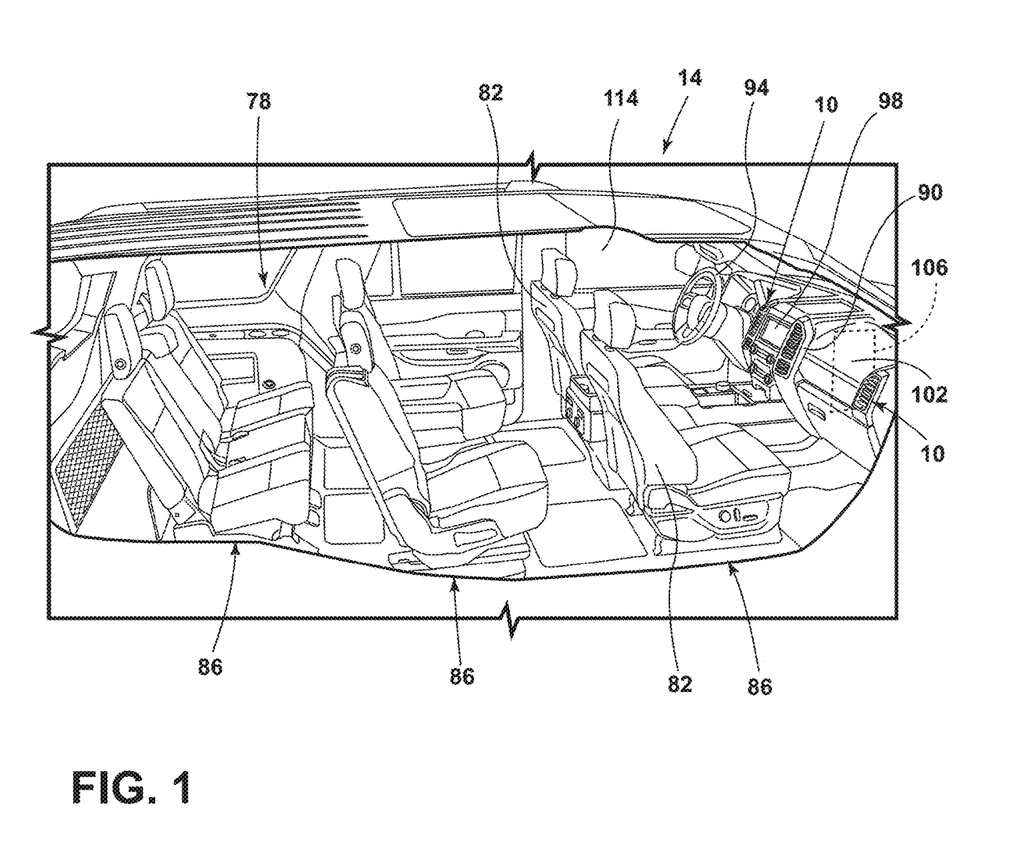
FIG. 1 is a side perspective view of a passenger cabin of a vehicle, according to at least one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-8, reference numeral 10 generally refers to a register assembly for a vehicle 14 including a register duct 18 that has an end opening 22 and directs air 26. A housing 30 is coupled to the register duct 18 proximate the end opening 22. A barrel 34 is disposed within the housing 30 and defines an upstream aperture 38 and a downstream aperture 42. A plurality of vanes 46 includes individual vanes 50. The individual vanes 50 extend between first opposing sides 54, 58 of the barrel 34. A linking vane 62 is coupled to each of the individual vanes 50 and extends between the second opposing sides 66, 70 of the barrel 34. The linking vane 62 includes a guide body 74 that extends upstream from the plurality of vanes 46.

Referring to FIG. 1, the vehicle 14 includes a passenger cabin 78 having multiple seating assemblies 82 arranged in more than one seating row 86. As illustrated in FIG. 1, the vehicle 14 includes three seating rows 86, however, it is contemplated that more or fewer seating rows 86 may be included in the passenger cabin 78 of the vehicle 14. Additionally or alternatively, each of the seating rows 86 may include one or more seating assemblies 82. The vehicle 14 may be a sedan, a sport utility vehicle, a van, a truck, a crossover, or other style vehicle 14. In various examples, the vehicle 14 may be a manually operated vehicle 14 (e.g., with a human driver), a fully autonomous vehicle 14 (e.g., with no human driver), or a partially autonomous vehicle 14 (e.g., operated with or without a human driver). Additionally, the vehicle 14 may be utilized for personal and/or commercial purposes, such as, for ride-providing services (e.g., chauffeuring) and/or ride-sharing services.

Figure 2:
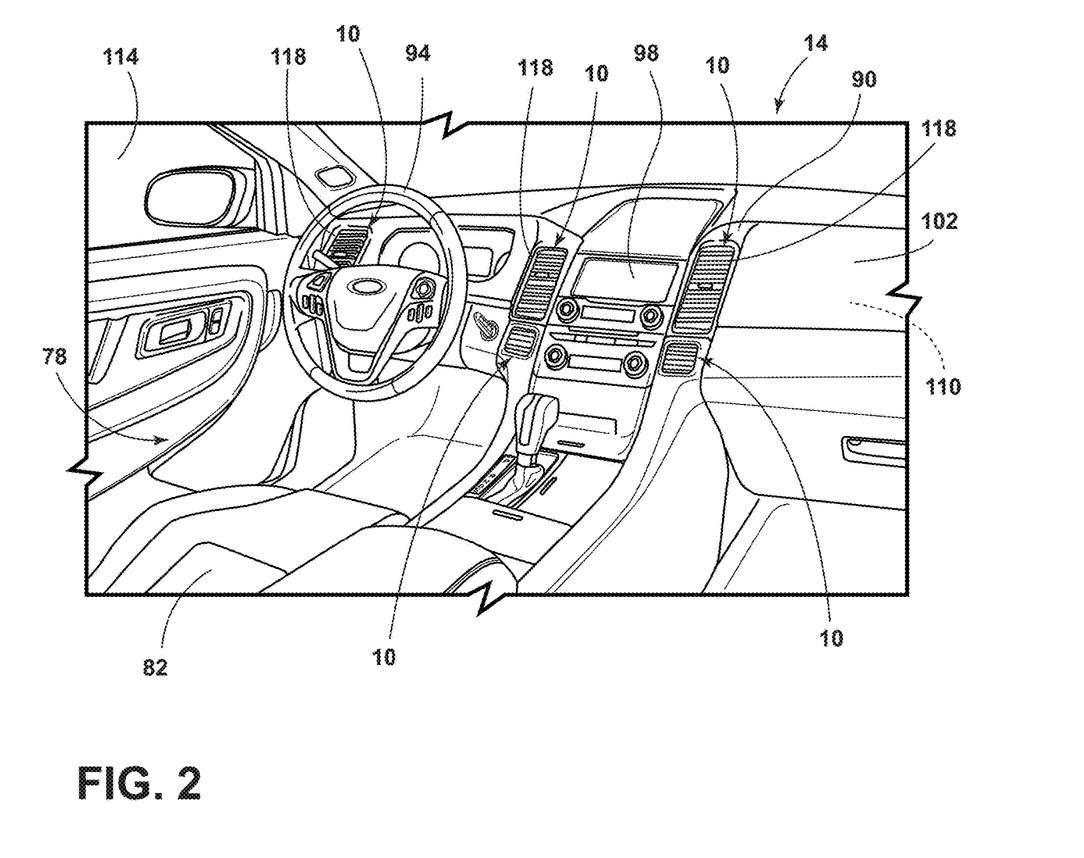
FIG. 2 is a front perspective view of a vehicle trim panel within a passenger cabin, according to at least one example.

Referring to FIGS. 1 and 2, the vehicle 14 includes a trim panel 90 configured as a dashboard disposed in a vehicle-forward portion of the vehicle 14. The trim panel 90 may include a steering wheel 94, a display screen 98, and various other vehicle components and/or controls. The trim panel 90 includes an A-surface 102 facing the passenger cabin 78. As used herein, the term "A-surface" 102 refers to the surface of any component within the vehicle 14 that is visible and/or contactable by an occupant of the vehicle 14 when the component is in an assembled state. When configured as the dashboard, the trim panel 90 extends laterally across the vehicle-forward portion of the vehicle 14 (e.g., a y-direction). It is also contemplated that the trim panel 90 may be disposed elsewhere in the vehicle 14 and may also be oriented in a different direction (e.g., an x-direction or a z-direction).

Referring to FIGS. 1 and 2, the vehicle 14 includes a heating, air conditioning, and ventilation (HVAC) system 106 disposed in the vehicle-forward portion of vehicle 14. The HVAC system 106 typically provides conditioned air 26 into the passenger cabin 78. The HVAC system 106 can clean, cool, heat, regulate, ventilate, and/or dehumidify the air 26 that is directed into the passenger cabin 78. The HVAC system 106 is typically disposed adjacent to a B-surface 110 of the trim panel 90. In this way, the HVAC system 106 can be substantially obscured from the view of occupants of the vehicle 14. As used herein, the term "B-surface" 110 refers to a surface of any component within the vehicle 14 that is concealed and/or non-contactable by an occupant of the vehicle 14 when the component is in an assembled state.

As illustrated in FIGS. 1 and 2, the vehicle 14 may include a plurality of register assemblies 10. The register assemblies 10 may be located to provide the air 26 to flow to various locations within the passenger cabin 78. For example, as illustrated in FIGS. 1 and 2, the vehicle 14 may include register assemblies 10 disposed on opposing sides of the display screen 98 and additional register assemblies 10 disposed proximate side windows 114 of the vehicle 14. One or more register assemblies 10 may be located in trim panels 90 positioned on pillar supports, a center console, or other locations within the passenger cabin 78. The different locations of the register assemblies 10 can provide air 26 (FIG. 8) to each of the seating rows 86 and/or provide different airflow patterns in the passenger cabin 78.

According to various aspects, the register assemblies 10 may be coupled to the trim panel 90. In this way, the trim panel 90 may define apertures 118. The register assemblies 10 can be disposed within the apertures 118. In various examples, the register assemblies 10 may be substantially flush with the A-surface 102 of the trim panel 90, or alternatively, may be set back within the trim panel 90 and offset from the A-surface 102. In this way, the register assemblies 10 may not protrude from the trim panel 90 and into the passenger cabin 78. It is contemplated that the register assemblies 10 may at least partially protrude from the A-surface 102.

Figure 3:
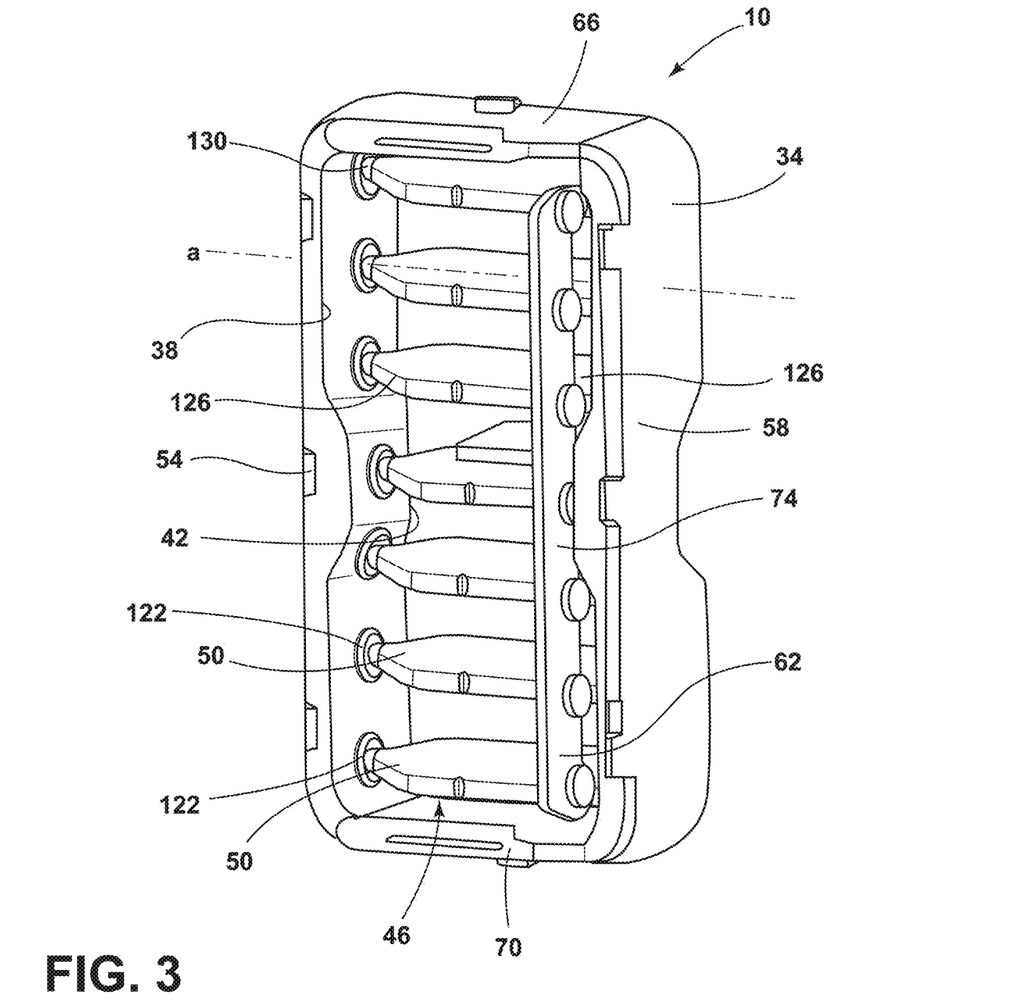
FIG. 3 is a rear perspective view of a register assembly for a vehicle, according to at least one example.

Referring to FIG. 3, each register assembly 10 may include the barrel 34, the plurality of vanes 46, and the linking vane 62. The barrel 34 may define the upstream and downstream apertures 38, 42 to allow the air 26 (FIG. 8) to flow therethrough. The barrel 34 may include the first opposing sides 54, 58 and the second opposing sides 66, 70. As illustrated in FIG. 3, the first opposing sides 54, 58 may be spaced-apart from one another and arranged generally parallel to one another. The second opposing sides 66, 70 may likewise be spaced-apart from one another and arranged generally parallel to one another. The second opposing sides 66, 70 may be configured as upper and lower sides coupled together by the first opposing sides 54, 58. The shape and/or size of the barrel 34 may vary based on the location of the register assembly 10 within the vehicle 14.

The individual vanes 50 of the plurality of vanes 46 may extend between the first opposing sides 54, 58 of the barrel 34. Stated differently, the individual vanes 50 may extend in a first direction between the first opposing sides 54, 58. As illustrated in FIG. 3, the individual vanes 50 extend laterally in the barrel 34; however, it is contemplated that the individual vanes 50 may extend longitudinally, or in any practicable direction. The individual vanes 50 may be spaced-apart from one another. In various examples, the individual vanes 50 may be arranged parallel to one another. In this way, spaces defined between the individual vanes 50 permit the air 26 (FIG. 8) to flow through the plurality of vanes 46. The individual vanes 50 may be equidistantly spaced-apart from one another, or alternatively, spaced-apart at different distances between some or all of the individual vanes 50. The individual vanes 50 may be rotatably coupled to the first opposing sides 54, 58 of the barrel 34. The barrel 34 may define receiving cavities 122 for receiving end portions 126 of each of the individual vanes 50. Each individual vane 50 may be received within two receiving cavities 122 on the respective first opposing sides 54, 58. Each of the individual vanes 50 may have a rotational axis a. Each of the individual vanes 50 may rotate about the respective rotational axis a to direct the air 26 (FIG. 8) in different directions.

The register assembly 10 may include the linking vane 62 that extends between the second opposing sides 66, 70 of the barrel 34. In this way, the linking vane 62 extends in a second direction. As illustrated in FIG. 3, the linking vane 62 extends longitudinally in the barrel 34; however, it is contemplated that the linking vane 62 may extend laterally or in any practicable direction. In various examples, the linking vane 62 may be coupled to each of the individual vanes 50. In this way, when the individual vanes 50 rotate about the respective rotational axis a, the linking vane 62 may operate to simultaneously rotate each of the individual vanes 50. According to various aspects, the linking vane 62 may be coupled proximate one of the end portions 126 of each of the individual vanes 50. When coupled proximate one of the end portions 126, the linking vane 62 may be disposed proximate one of the first opposing sides 54, 58. In this way, a distance between the linking vane 62 and one of the first opposing sides 54, 58 may be less than a distance between the linking vane 62 and the other first opposing side 54, 58. Stated differently, the linking vane 62 may be offset from a central axis (e.g., a y-axis) of the barrel 34.

Figure 4:
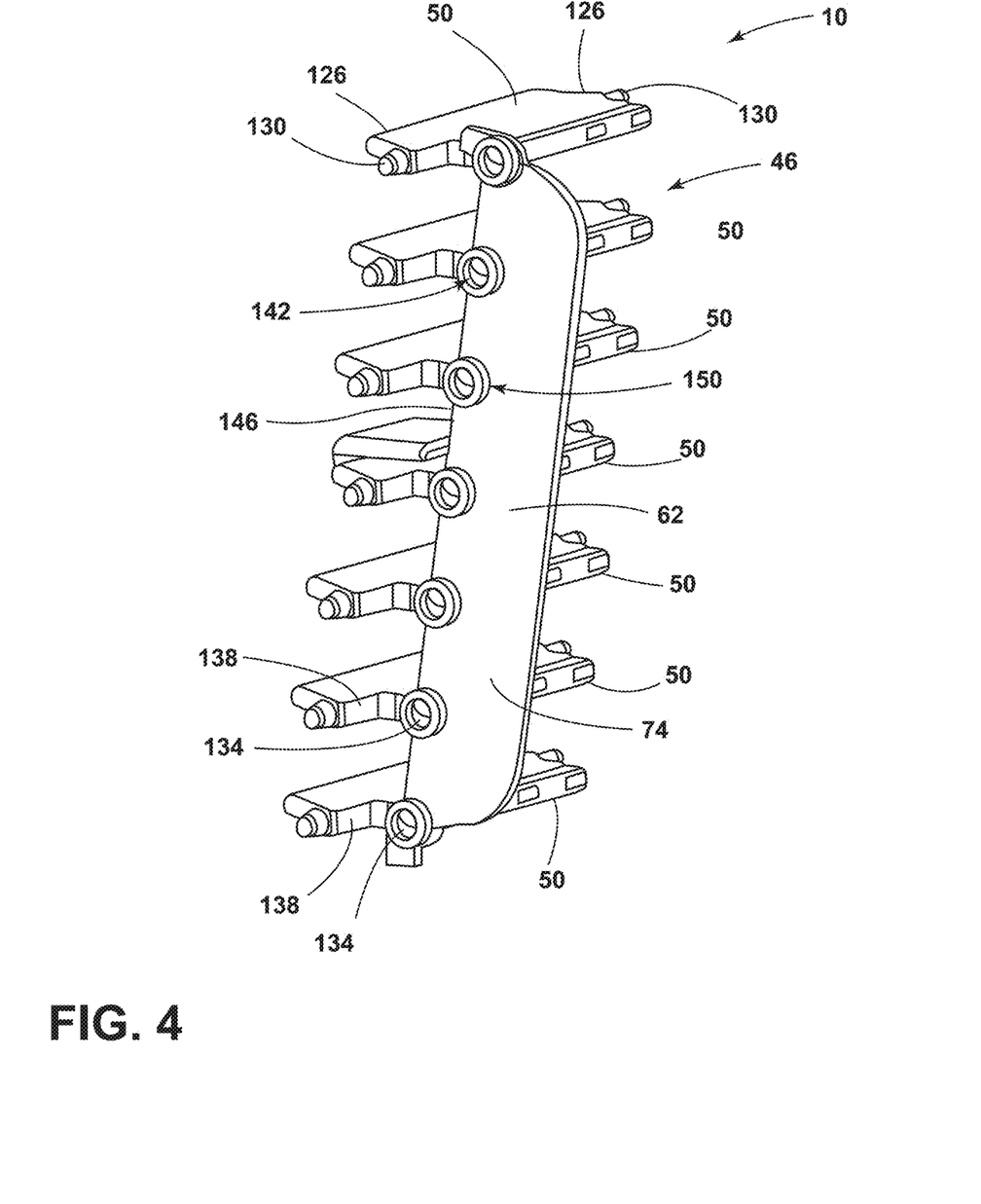
FIG. 4 is a rear perspective view of a linking vane coupling a plurality of vanes of the register assembly of FIG. 3.

Referring to FIGS. 3 and 4, each of the individual vanes 50 may define engagement members 130 that extend from the end portions 126 and are configured to engage the barrel 34 within the receiving cavities 122. Additionally or alternatively, each of the individual vanes 50 may include a coupling member 134 configured to couple to the linking vane 62. The coupling members 134 may be disposed proximate one of the end portions 126 of the individual vanes 50. In various examples, each of the individual vanes 50 may define a cutout 138 proximate one of the end portions 126. In this way, a width of one of the end portions 126 of the individual vanes 50 may be less than a width of the other opposing end portion 126. The coupling member 134 may extend from the individual vanes 50 from within the cutout 138 toward the respective end portion 126. In this way, the coupling members 134 may not extend past the respective end portion 126 of each of the individual vanes 50.

According to various aspects, the linking vane 62 may define a plurality of apertures 142 along a linking edge 146 thereof. The plurality of apertures 142 may be spaced-apart from one another along the linking edge 146 and arranged in a linear arrangement. The plurality of apertures 142 may receive a corresponding coupling member 134 to couple the linking vane 62 with the individual vanes 50. In various examples, the linking vane 62 may define a plurality of receiving frames 150 corresponding with the plurality of apertures 142. In this way, each of the plurality of apertures 142 may be disposed in a corresponding one of the plurality of receiving frames 150. Stated differently, the plurality of receiving frames 150 may be disposed around the plurality of apertures 142. The plurality of receiving frames 150 may be advantageous for properly aligning the individual vanes 50 with the linking vane 62 when assembling the register assembly 10. The plurality of receiving frames 150 may also be advantageous for providing additional strength, support, and/or rigidity to the linking vane 62 proximate the plurality of apertures 142.

Figure 5A:
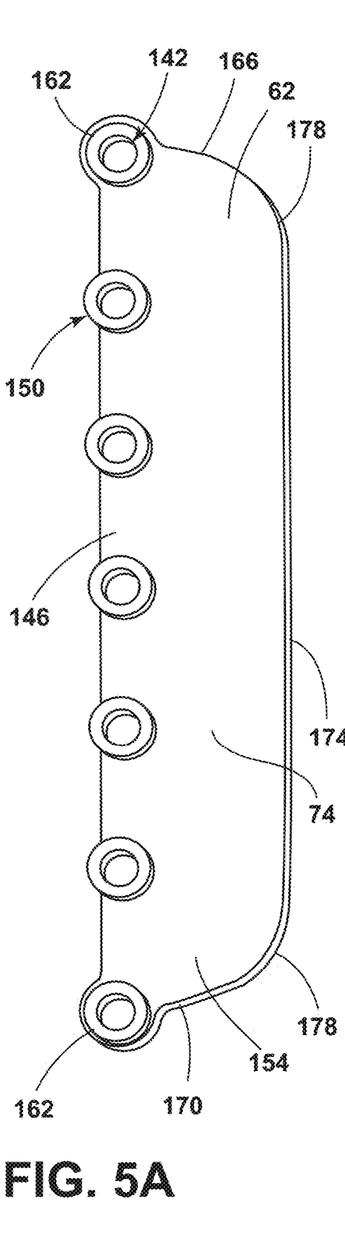
FIG. 5A is a top perspective view of a linking vane for a vehicle register assembly according to at least one example.
Figure 5B:
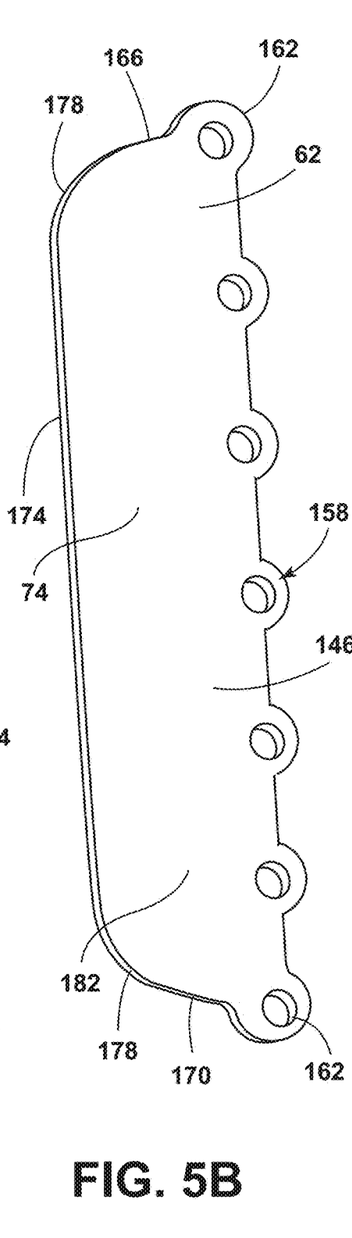
FIG. 5B is a bottom perspective view of the linking vane of FIG. 5A.
Figure 5C:
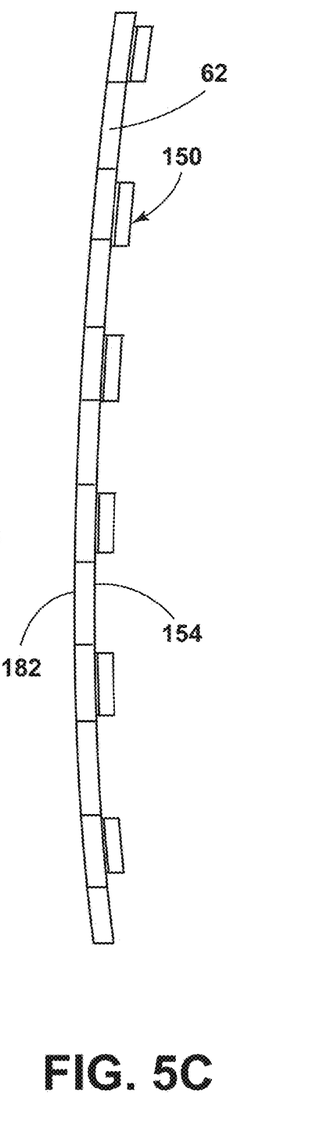
FIG. 5C is a side elevational view of the linking vane of FIG. 5A.

Referring to FIGS. 5A-5C, the plurality of receiving frames 150 may be coupled to a first surface 154 of the linking vane 62, such that the receiving frames 150 extend outward from the first surface 154. It is also contemplated that the plurality of receiving frames 150 may be flush with the first surface 154 so as not to protrude therefrom. The linking edge 146 may include a plurality of protrusions 158 extending outwardly therefrom and away from the guide body 74. The plurality of protrusions 158 may be spaced-apart from one another. It is contemplated that the plurality of protrusions 158 may be equidistantly spaced-apart from one another, or alternatively may be spaced-apart at different distances between some or all of the plurality of protrusions 158. Each of the plurality of protrusions 158 may align with a corresponding one of the plurality of apertures 142. In this way, each of the plurality of protrusions 158 may at least partially define one of the plurality of apertures 142. Additionally or alternatively, the receiving frames 150 may be coupled to the plurality of protrusions 158 of the linking vane 62. In various examples, the outermost protrusions 162 may extend beyond side edges 166, 170 of the linking vane 62. In this way, the linking edge 146 may have a length that is greater than a length of an upstream edge 174 of the guide body 74 of the linking vane 62.

In various examples, the linking vane 62 includes the guide body 74 extending outwardly from the linking edge 146. The shape of the guide body 74 may be defined by the side edges 166, 170 and the upstream edge 174. The side edges 166, 170 and the upstream edge 174 may define rounded corners 178 therebetween. The rounded corners 178 may promote a laminar airflow through the register assembly 10 (FIG. 1). The side edges 166, 170 may extend between the upstream edge 174 and proximate the linking edge 146. As illustrated in FIG. 5A, the side edges 166, 170 may extend from proximate a central portion of the outermost protrusions 162, and accordingly, the corresponding outermost apertures of the plurality of apertures 142 and outermost receiving frames of the plurality of receiving frames 150. In this way, the outermost protrusions 162 may extend beyond the side edges 166, 170 of the linking vane 62. Stated differently the outermost protrusions 162 may extend outwardly relative to the side edges 166, 170.

As illustrated in FIG. 5A, the first surface 154 of the linking vane 62 may be substantially continuous and/or planar except for the plurality of receiving frames 150 extending therefrom. A second surface 182, as illustrated in FIG. 5B, may be substantially continuous and/or planar. In this way, the first and second surfaces 154, 182 may be a substantially flat and/or smooth surface to promote a laminar airflow through the register assembly 10 (FIG. 1). According to various aspects, as illustrated in FIG. 5C, the linking vane 62 may be curved and/or rounded. It is contemplated that the linking vane 62 may be substantially linear.

In various aspects, the linking vane 62 may have a thickness less than a thickness of the individual vanes 50 (FIG. 3). The linking vane 62 may extend upstream in an airflow path from the individual vanes 50 (FIG. 3). The lesser thickness may be advantageous for reducing turbulence and/or blocking of the airflow. Additionally or alternatively, the linking vane 62 may have a width in a range of from about 8 mm to about 30 mm. The width may be defined between the linking edge 146 and the upstream edge 174. The increased width resulting from the guide body 74 may assist in directing the airflow through the register assembly 10 (FIG. 1). In various examples, the linking vane 62 may include thermoplastic materials, such as, for example, polyoxylmethylene.

Figure 6:
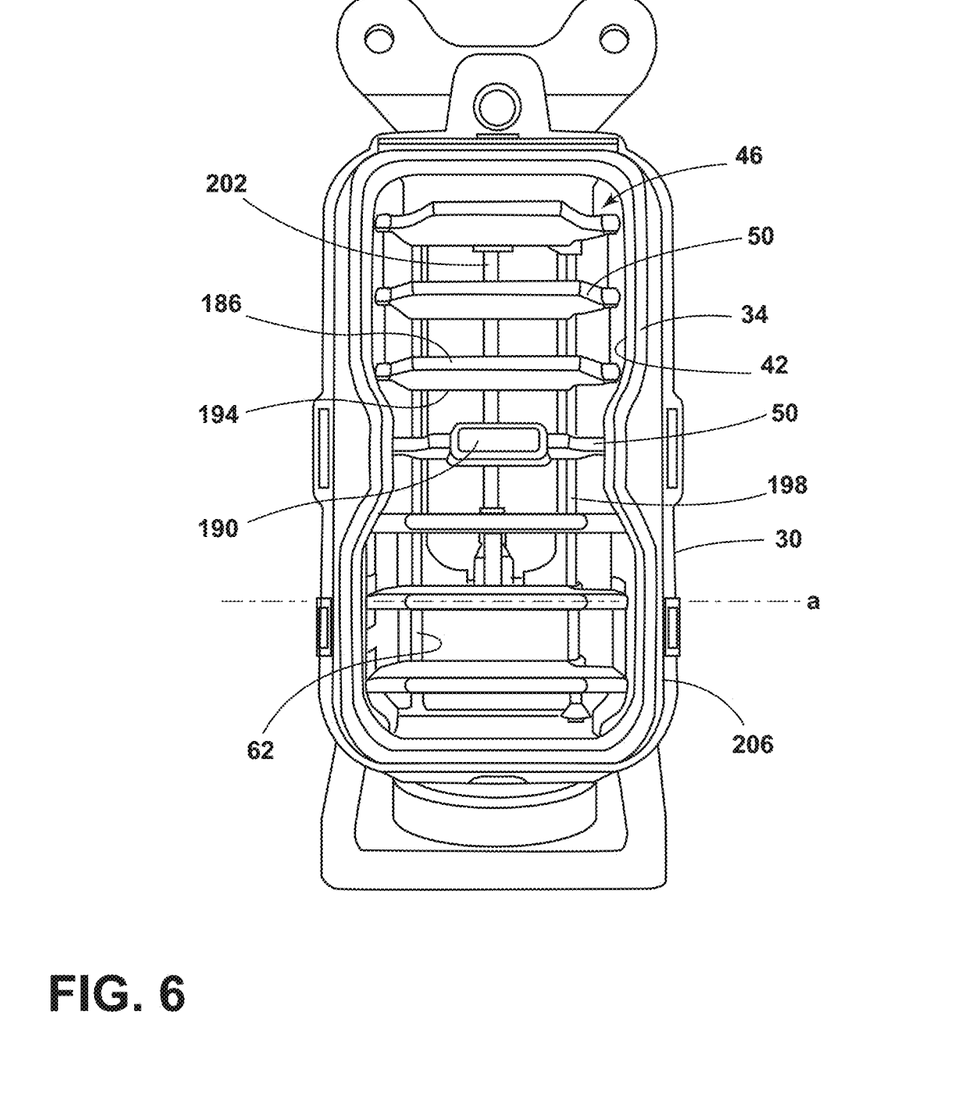
FIG. 6 is a front elevational view of a register assembly for a vehicle, according to at least one example.

Referring to FIG. 6, the plurality of vanes 46 may be disposed proximate the downstream aperture 42 of the barrel 34. In this way, the plurality of vanes 46 may be configured as a front vane pack. A downstream side 186 of the individual vanes 50 may substantially align with the downstream aperture 42 of the barrel 34. The downstream side 186 and the downstream aperture 42 typically faces the passenger cabin 78 (FIG. 1). At least one of the individual vanes 50 may include an adjustment member 190 coupled thereto. The adjustment member 190 can be engaged by the occupant of the vehicle 14 (FIG. 1) to rotate the plurality of vanes 46 along the respective rotational axes a. As illustrated in FIG. 6, the occupant can rotate the individual vanes 50 up-and-down relative to the barrel 34. However, in other configurations, it is contemplated that the individual vanes 50 may rotate side-to-side or in any other practicable direction. As the occupant manipulates the individual vane 50 with the adjustment member 190, the other individual vanes 50 simultaneously rotate via the linking vane 62.

Figure 7:
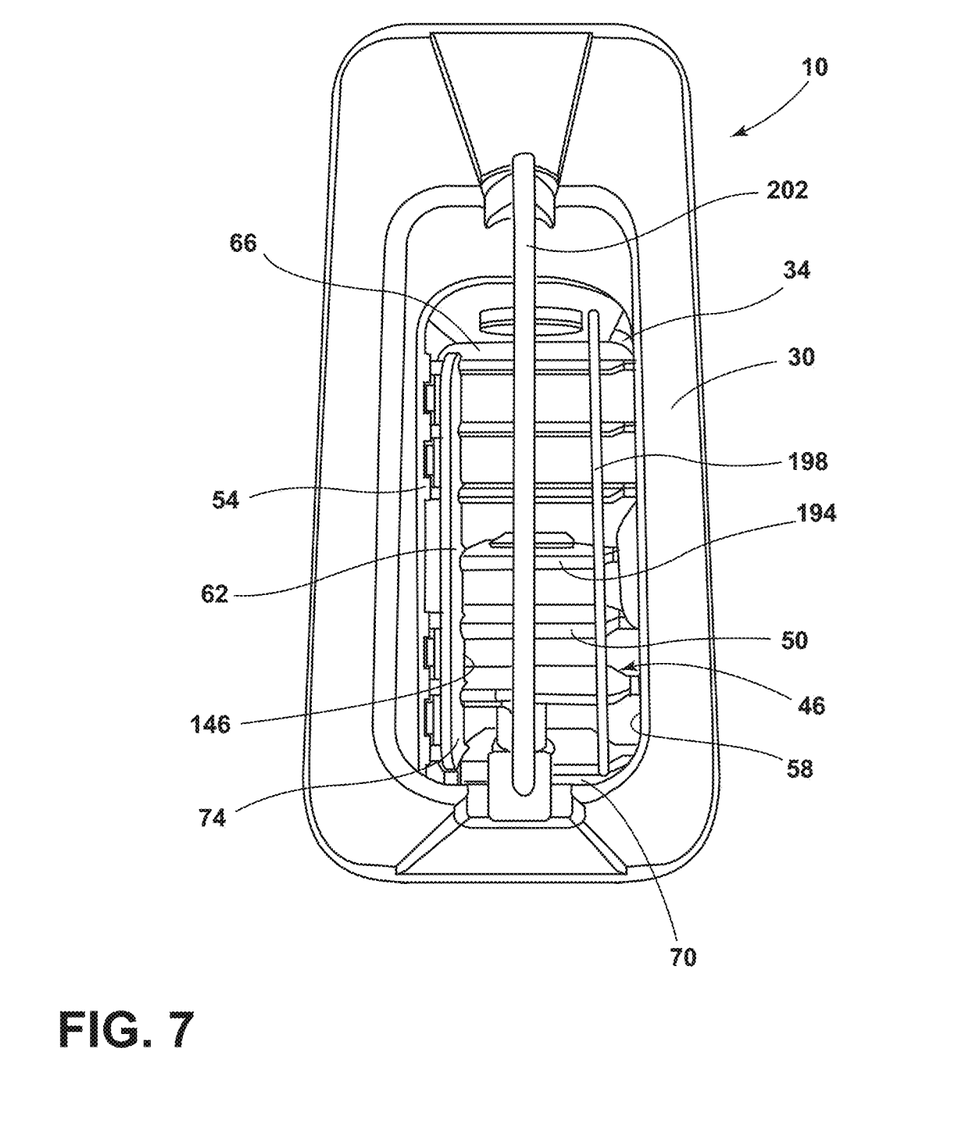
FIG. 7 is a rear elevational view of the register assembly of FIG. 6.

Referring to FIGS. 6 and 7, the linking vane 62 may be coupled to an upstream side 194 of the individual vanes 50. In this way, the linking edge 146 may couple to the individual vanes 50 and the guide body 74 may extend upstream therefrom. Stated differently, the linking vane 62 may be disposed upstream of the plurality of vanes 46. In various examples, the register assembly 10 may not include a rear vane pack. In such examples, the plurality of vanes 46 may be configured as the front vane pack may be disposed in a downstream portion of the barrel 34 and no additional set of vanes are included upstream of the plurality of vanes 46. The linking vane 62 can operate to guide the air 26 (FIG. 8) through the barrel 34 to the plurality of vanes 46, as well as, link the individual vanes 50 to one another. The linking vane 62 may move in response to movement of the individual vanes 50, which can contribute to the register assembly 10 directing the airflow.

In various examples, the register assembly 10 may include a support member 198 that extends in the second direction between the second opposing sides 66, 70 of the barrel 34. In this way, the support member 198 may extend substantially parallel to the linking vane 62. The support member 198 may be spaced-apart from the linking vane 62. According to various aspects, the support member 198 may be coupled to both the second opposing sides 66, 70 to provide additional strength, support, and/or rigidity to the barrel 34. In various examples, the support member 198 may be configured as an additional linking vane 62. Additionally or alternatively, the support member 198 may be configured as a rod that extends across the barrel 34.

Figure 8:
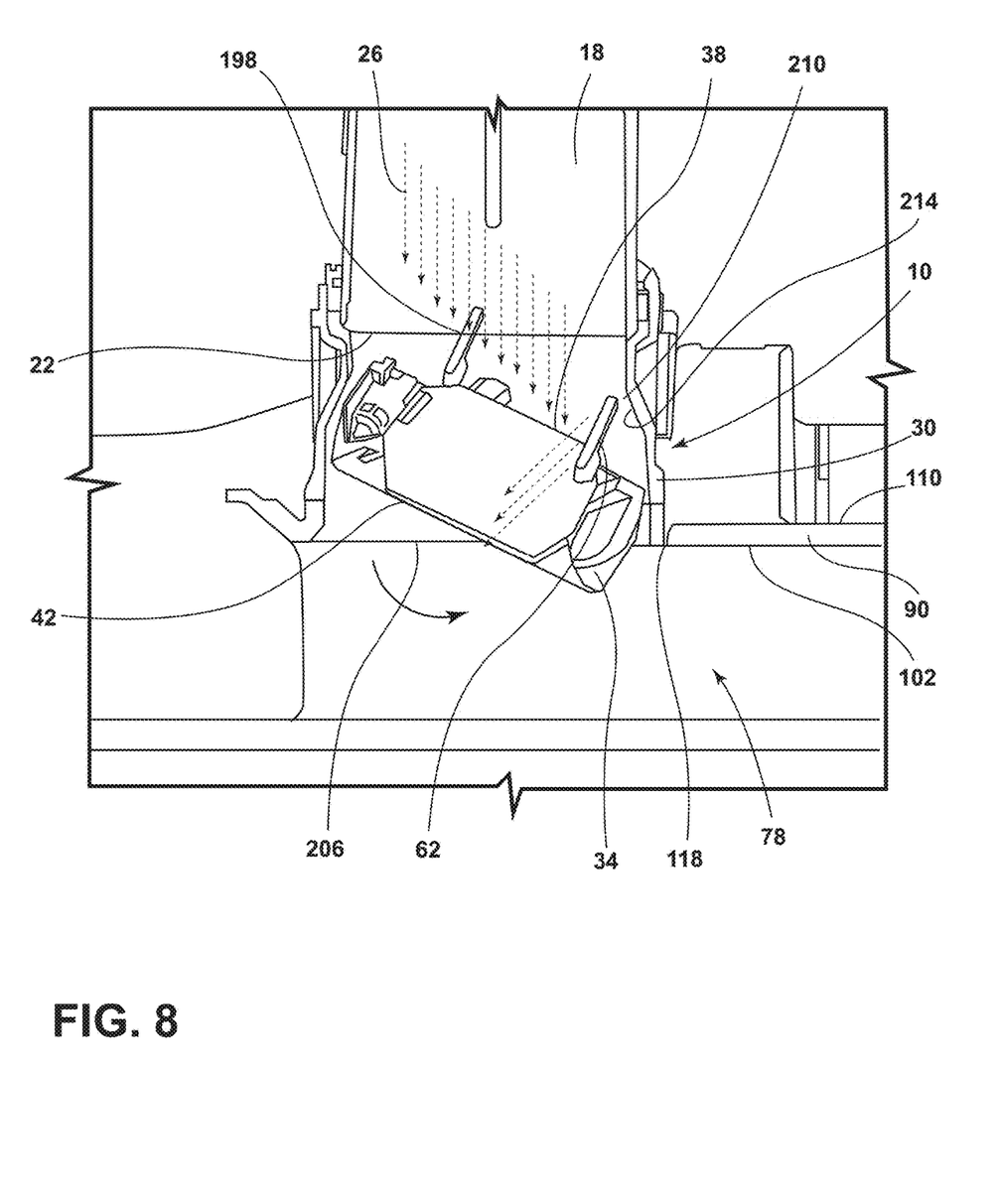
FIG. 8 is a cross-sectional view of a vehicle register assembly associated with a register duct, according to at least one example.

Referring to FIGS. 7 and 8, the housing 30 may be coupled to the register duct 18 proximate to end opening 22. The register duct 18 may extend between the HVAC system 106 (FIG. 1) and the trim panel 90. The housing 30 may align with the aperture 118 of the trim panel 90 to allow air 26 to flow into the passenger cabin 78. The housing 30 may include a support feature 202 disposed upstream of the barrel 34. The support feature 202 may add strength, support, and/or rigidity to the housing 30. In various examples, the support feature 202 may be arranged spaced-apart from and/or parallel to the linking vane 62. Referring to FIG. 8, the register assembly 10 may be associated with the register duct 18. The register duct 18 may extend from the HVAC system 106 (FIG. 1) to direct the air 26 to the passenger cabin 78. In various examples, the register duct 18 may be part of a duct assembly, such that at least one register duct 18 may be associated with each of the register assemblies 10 disposed within the vehicle 14. The housing 30 may be coupled to the register duct 18 proximate the end opening 22 of the register duct 18. In this way, the air 26 may flow through the register duct 18, out of the end opening 22, and through the housing 30 to the passenger cabin 78. The housing 30 may have an increasing width from proximate the end opening 22 of the register duct 18 toward the passenger cabin 78. The increasing width may accommodate rotation of the barrel 34 within the housing 30.

In various examples, the barrel 34 may be disposed within the housing 30. The size and/or shape of the housing 30 may substantially correspond with the size and/or shape of the barrel 34. The upstream aperture 38 of the barrel may be disposed proximate the end opening 22 of the register duct 18 and the downstream aperture 42 may be disposed proximate the trim panel 90. In various examples, the barrel 34 may be rotatable within the housing 30. The barrel 34 may be rotated side-to-side, up-and-down, and/or a combination thereof. The barrel 34 may rotate between first and second angled positions and a third position therebetween. As illustrated in FIG. 8, the barrel 34 is shown in the first angled position where the barrel 34 is angled toward a left portion of the housing 30. In such examples, the second angled position may be a mirror image of the first angled position where the barrel 34 is angled toward a right portion of the housing 30. As the barrel 34 rotates, the barrel 34 may extend at least partially into the passenger cabin 78. In this way, the barrel 34 may be at least partially extend past a downstream opening 206 of the housing 30, which may be aligned with the A-surface 102 of the trim panel 90. Additionally or alternatively, when in the third position of the barrel 34 may be substantially flush and/or parallel with a downstream opening 206 of the housing 30, as best illustrated in FIG. 6.

Referring again to FIG. 8, the register assembly 10 is illustrated with the linking vane 62 and the support member 198 extending beyond the upstream aperture 38 of the barrel 34. In this way, the linking vane 62 and/or the support member 198 may be configured to reduce a gap 210 between an inner surface 214 of the housing 30 and the barrel 34 when the barrel 34 is in the first and/or second angled positions. Reduction of the gap 210 may be advantageous for limiting airflow leakage. The airflow leakage refers to air 26 that flows between the housing 30 and the barrel 34 instead of flowing through the upstream and downstream apertures 38, 42 of the barrel 34. The airflow leakage may cause a weaker airflow to enter the passenger cabin 78 from the register assembly 10. In this way, the guide body 74 may be disposed proximate the inner surface 214 of the housing 30 when the barrel 34 is rotated with the housing 30 to reduce the gap 210 between the barrel 34 and the housing 30.

Referring to FIGS. 1-8, in operation, the air 26 flows through the register duct 18, through the register assembly 10, and into the passenger cabin 78. The air 26 may flow towards various locations within the passenger cabin 78. In this way, the air 26 may be provided to each of the seating rows 86 within the passenger cabin 78. As such, the register assemblies 10 may be disposed in a variety of locations within the vehicle 14. The angle of the barrel 34, as well as, the angle of the individual vanes 50 of the plurality of vanes 46 and/or the linking vane 62 may direct the air 26 to a selected direction within the vehicle 14. The linking vane 62 may operate to couple the individual vanes 50 and guide the air 26 through the register assembly 10.

Use of the present disclosure may provide for a variety of advantages. For example, the linking vane 62 may couple and/or link the individual vanes 50 while guiding the air 26 through the barrel 34. In this way, fewer components may be included in the register assembly 10, which may be advantageous for reducing turbulence of the airflow. Moreover, this may provide for a more laminar airflow from the HVAC system 106 to the passenger cabin 78, which may increase the strength of the airflow. Additionally, the guide body 74 of the linking vane 62 may reduce the gap 210 between the housing 30 and the barrel 34. In this way, airflow leakage may be reduced, thereby improving the airflow from the register assembly 10 into the passenger cabin 78. Further, the linking vane 62 may improve efficiency of the register assembly 10. Also, use of the linking vane 62 may allow for removal of a rear vane pack from the register assembly 10. This may be advantageous for removing components that can disrupt the airflow. Further, this can reduce manufacturing and production costs. Additional benefits or advantages of using this device may be realized and/or achieved.

According to various examples, a register assembly for a vehicle includes a register duct that has an end opening. A barrel is coupled to the register duct proximate the end opening and the barrel defines an upstream aperture and a downstream aperture. A plurality of vanes includes individual vanes where the individual vanes extend in a first direction between first opposing sides of the barrel. A linking vane includes a guide body and extends in a second direction. The linking vane includes a linking edge coupled to the individual vanes and the guide body extends outwardly therefrom. The linking vane extends between second opposing sides of the barrel. Embodiments of the present disclosure may include one or a combination of the following features:
- each individual vane defines a coupling member, and a linking vane defines a plurality of apertures along a linking edge thereof configured to receive a corresponding coupling members;
- a barrel is rotatable to at least one angled position relative to a housing, and a guide body reduces a gap between the housing and the barrel when the barrel is in the at least one angled position;
- a linking edge of a linking vane includes a plurality of receiving frames disposed around a plurality of apertures;
- outermost receiving frames of a plurality of receiving frames extend outwardly relative to side edges of the guide body;
- a linking edge includes a plurality of protrusions that extend therefrom, and a plurality of apertures correspond with the plurality of protrusions;
- a linking edge has a length greater than a length of an upstream edge of a guide body; and
- a guide body has a width in a range of from about 8 mm to about 30 mm.

According to various examples, a register assembly for a vehicle includes a register duct that has an end opening. A barrel is coupled to the register duct proximate the end opening and the barrel defines an upstream aperture and a downstream aperture. A plurality of vanes includes individual vanes where the individual vanes extend in a first direction between first opposing sides of the barrel. A linking vane includes a guide body and extends in a second direction. The linking vane includes a linking edge coupled to the individual vanes and the guide body extends outwardly therefrom. The linking vane extends between second opposing sides of the barrel. Embodiments of the present disclosure may include one or a combination of the following features:
- a linking edge has a length greater than a length of an upstream edge of a guide body;
- a linking vane has a thickness less than a thickness of each individual vane;
- a linking vane is coupled to an upstream side of each individual vane and extends upstream therefrom;
- a housing is coupled to a register duct, and a barrel is disposed within the housing; and
- a distance between a linking vane and one of the first opposing sides is less than a distance between the linking vane and the other first opposing side.

According to various examples, a register assembly includes a register duct that has an end opening. A barrel is coupled to the register duct proximate the end opening. A plurality of vanes are spaced-apart from one another and extends between first opposing sides. Each of the plurality of vanes defines a coupling member. A linking vane extends between second opposing sides and has a linking edge coupled to the plurality of vanes. The linking edge defines a plurality of apertures for receiving corresponding coupling members and a guide body that extends outwardly from the linking edge. Embodiments of the present disclosure may include one or a combination of the following features:
- an upstream edge and side edges of a guide body define rounded corners therebetween;
- a support member extends between second opposing sides, and a support member is spaced-apart from a linking vane;
- a linking vane includes a thermoplastic material;
- a linking vane is coupled to an end portion of each of a plurality of vanes proximate one first opposing side; and
- a guide body has a width in a range of from about 8 mm to about 30 mm.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the device as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle register assembly, comprises:
    a register duct having an end opening, wherein the register duct directs air toward a passenger compartment;
    a housing coupled to the register duct proximate the end opening;
    a barrel disposed within the housing and defining an upstream aperture proximate the register duct and a downstream aperture proximate the passenger compartment;
    a plurality of vanes including individual vanes, wherein the individual vanes extend between first opposing sides of the barrel adjacent to the downstream aperture of the barrel; and
    a linking vane coupled to each of the individual vanes and extending between second opposing sides of the barrel, the linking vane configured to move between the second opposing sides as the individual vanes rotate, wherein the linking vane includes a guide body that extends upstream from the plurality of vanes, through the upstream aperture of the barrel, and into the housing to direct the air through the barrel, an upstream edge of the guide body being disposed adjacent to an inner surface of the housing to reduce a gap between the housing and the barrel to reduce airflow leakage between the housing and the barrel and deflect the air through the barrel, and wherein the guide body extends through the upstream aperture as the linking vane moves along an arcuate path between the second opposing sides when the individual vanes are in a center position relative to the barrel and in fully angled positions relative to the barrel.

2. The vehicle register assembly of claim 1, wherein each of the individual vanes defines a coupling member, and wherein the linking vane defines a plurality of apertures along a linking edge thereof configured to receive a corresponding coupling member.

3. The vehicle register assembly of claim 1, wherein the barrel is rotatable to at least one angled position relative to the housing, and wherein the upstream edge of the guide body is disposed adjacent to the inner surface of the housing when the barrel is in the at least one angled position to reduce the gap between the housing and the barrel.

4. The vehicle register assembly of claim 1, wherein a linking edge of the linking vane includes a plurality of receiving frames disposed around a plurality of apertures.

5. The vehicle register assembly of claim 4, wherein outermost receiving frames of the plurality of receiving frames extend outwardly relative to side edges of the guide body.

6. The vehicle register assembly of claim 4, wherein the linking edge includes a plurality of protrusions extending therefrom, and wherein the plurality of apertures correspond with the plurality of protrusions.

7. The vehicle register assembly of claim 1, wherein a linking edge has a length greater than a length of an upstream edge of the guide body.

8. The vehicle register assembly of claim 1, wherein the guide body has a width in a range of from about 8 mm to about 30 mm.

9. A register assembly for a vehicle, comprising:
    a register duct having an end opening;
    a barrel coupled to the register duct via a housing proximate the end opening, wherein the barrel defines an upstream aperture and a downstream aperture;
    a plurality of vanes including individual vanes, wherein the individual vanes extend in a first direction between first opposing sides of the barrel proximate to the downstream aperture of the barrel; and
    a linking vane including a guide body, the linking vane extending in a second direction, wherein the linking vane includes a linking edge coupled to the individual vanes within the barrel and the guide body extends outwardly therefrom and through the upstream aperture of the barrel into the housing proximate an inner surface of the housing to deflect air through the barrel and reduce airflow leakage between the housing and the barrel, the guide body extending through the upstream aperture as the linking vane moves along a path in the second direction when the individual vanes rotate and are in a center position relative to the barrel and in fully angled positions relative to the barrel, and wherein the linking vane extends between second opposing sides of the barrel.

10. The register assembly of claim 9, wherein the linking edge has a length greater than a length of an upstream edge of the guide body.

11. The register assembly of claim 9, wherein the linking vane has a thickness less than a thickness of each of the individual vanes.

12. The register assembly of claim 9, wherein the linking vane is coupled to an upstream side of each of the individual vanes and extends upstream therefrom.

13. The register assembly of claim 9, wherein the barrel is disposed within the housing.

14. The register assembly of claim 9, wherein a distance between the linking vane and one of the first opposing sides is less than a distance between the other first opposing side.

15. A register assembly, comprising
a register duct having an end opening;
a barrel coupled to the register duct via a housing proximate the end opening, the barrel being at least partially disposed within the housing;
a plurality of vanes spaced-apart from one another and extending between first opposing sides, wherein each of the plurality of vanes defines a coupling member; and
a linking vane extending between second opposing sides and having a linking edge coupled to the plurality of vanes, wherein the linking edge defines a plurality of apertures for receiving corresponding coupling members and includes a guide body extending outwardly from the linking edge, the linking vane configured to move between the second opposing sides as the plurality of vanes rotates, and wherein a downstream edge of the linking vane is disposed within the barrel and an upstream edge of the linking vane is disposed outside of the barrel proximate an inner surface of the housing to deflect air through the barrel, wherein the guide body extends through the upstream aperture for the upstream edge to remain outside of the barrel as the linking vane moves when the plurality of vanes rotates between a center position relative to the barrel and in fully angled positions relative to the barrel.

16. The register assembly of claim 15, wherein the upstream edge and side edges of the guide body define rounded corners therebetween.

17. The register assembly of claim 15, further comprising:
a support member extending between the second opposing sides, wherein the support member is spaced-apart from the linking vane, and wherein the support member extends through an upstream aperture defined by the barrel.

18. The register assembly of claim 15, wherein the linking vane includes a thermoplastic material.

19. The register assembly of claim 15, wherein the linking vane is coupled to an end portion of each of the plurality of vanes proximate one of the first opposing sides.

20. The register assembly of claim 15, wherein the guide body has a width in a range of from about 8 mm to about 30 mm.

* * * * *

UNITED STATES PATENT AND TRADEMARK OFFICE
CERTIFICATE OF CORRECTION

| | |
|---|---|
| PATENT NO. | : 11,660,937 B2 |
| APPLICATION NO. | : 16/594619 |
| DATED | : May 30, 2023 |
| INVENTOR(S) | : José Fernando Ovando Sánchez et al. |

It is certified that error appears in the above-identified patent and that said Letters Patent is hereby corrected as shown below:

In the Claims

Column 12:
Claim 9, Line 65;
After "vane" delete "and"

Column 14:
Claim 15, Line 16;
Delete "in"

Signed and Sealed this
Fourteenth Day of November, 2023

Katherine Kelly Vidal
*Director of the United States Patent and Trademark Office*